Jan. 8, 1935.  C. A. BECKER  1,986,995

BALANCE OR WEIGHING SCALE

Filed March 7, 1934

INVENTOR
Christopher A. Becker,
BY
Fraser, Myers & Manley
ATTORNEYS.

Patented Jan. 8, 1935

1,986,995

UNITED STATES PATENT OFFICE 1,986,995

BALANCE OR WEIGHING SCALE

Christopher A. Becker, Nutley, N. J., assignor to The Torsion Balance Company, New York, N. Y., a corporation of New York Application March 7, 1934, Serial No. 714,410

2 Claims. (Cl. 265—60)

My present invention relates to weighing scales or balances of the type employing a weighing chain hung at one end from the scale beam of the balance, and at the other or dead end from a slide which is adjustable up and down on a graduated column or support. Balances of this type are shown in my prior patents, No. 1,203,686, dated November 7, 1916, and 1,591,802, dated July 6, 1926.

In balances of said type as heretofore constructed, the vernier block to which the dead end of the chain is hung is supported on a nut which is movable over a spirally grooved or fast threaded vertical screw which is rotatable through the medium of bevel gears or friction-faced means and the weight of the nut is relied upon to overcome backlash to hold the vernier block in set position.

According to my present invention I do away with the threaded vertical screw and nut construction, and in lieu thereof provide a vernier block carrier or slide mounted on a flexible tensioned member which is trained over a pair of pulleys, one of which is mounted in the top of the hollow, graduated column along which the vernier block is movable, and the other of which is mounted on a supporting shaft extending through the balance case and operable from the exterior thereof. Preferably the flexible, tensioned member is in the form of a fine chain, one end of which is connected to the carrier and the other end of which is connected to a fine helical spring, which latter is also connected to the carrier and normally maintained under slight tension so as to provide at all times, irrespective of temperature and atmospheric conditions, a tension on the chain sufficient to frictionally hold the vernier block in any set position. By said construction the following advantages are realized: backlash is eliminated; smoother and more uniform movement of the vernier block unaccompanied by any lateral swinging of the chain; greater accuracy and speed in making adjustments of the vernier block; and the operating means are simplified, thereby lowering the production cost of the device.

The invention will be better understood from the detailed description which follows, when considered in conjunction with the accompanying drawing, wherein Figure 1 is a front elevation of a laboratory balance embodying my invention.

Figure 1:
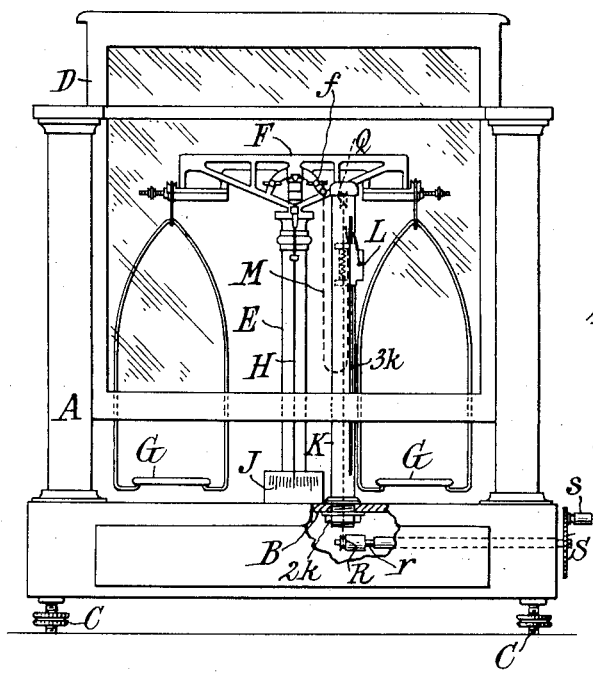
Figure 2:
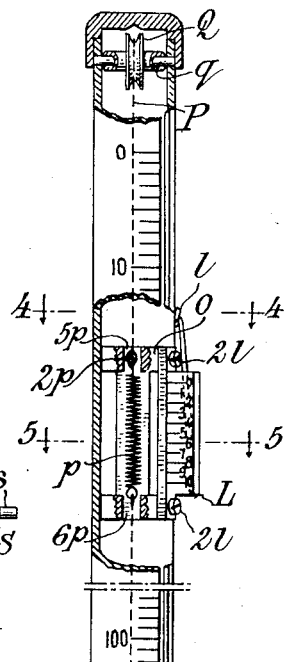
Fig. 2 is an enlarged elevation with parts broken away to show the details of construction of the invention.
Figure 4:
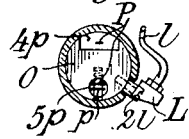
Figure 5:
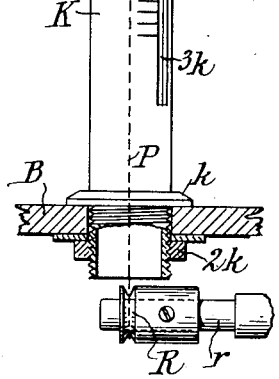
Figure 3:
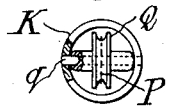
Fig. 3 is a top plan view of the column with the cap thereof removed.

Figs. 4 and 5 are sections taken respectively along the planes of the lines 4—4 and 5—5 of Fig. 2.

Figure 6:
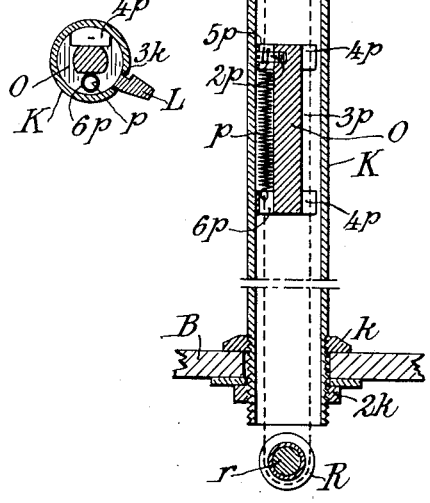

Fig. 6 is a diametrical section taken substantially at a right angle to that shown in Fig. 2.

Referring to the drawing, wherein I have shown the invention as embodied in a conventional form of laboratory balance, let A indicate a balance case having a base B, conventional leveling screws C, and a sliding front or panel D. Within the case is a conventional column E mounted upon the base and supporting a balance beam F, from the ends of which are suspended scale pans G. Also depending from the balance beam F is a needle or pointer H which is adapted to swing in front of a graduated index J. Within the case to one side of the column E is a hollow, vertical, graduated column K mounted on the base B through the medium of clamping nuts $k$ and $2k$, said column having a longitudinal slot $3k$ therein, in which is slidable a vernier block L provided with a hook $l$ from which is hung the dead end of a weighing chain M, the active component of which is hung from a carrier element $f$ mounted on the beam F. The construction thus far described is substantially similar to that embodied in the "Chainomatic" balance now in general use and described in detail in my aforementioned Patent No. 1,203,686.

The present construction of balance primarily differs from the balance disclosed in my aforementioned patent in the manner and means for setting the vernier block or movable index L longitudinally of the column K so as to vary the effective component of the chain M in performing the weighing operation. As herein shown, the vernier block L is mounted upon a vernier block carrier or slide-block O through the medium of securing elements $2l$, said vernier block carrier having a sliding fit within the column K. The slide block O is mounted for movement with a longitudinally flexible carrier P which is trained over a pulley Q mounted on a shaft $q$ fitted within the column K in proximity to its top and around an aligned pulley R mounted upon a shaft $r$ disposed below the base B and extending through the side of the case, and at the outer end of which is provided an operating wheel S with a finger piece or handle $s$. The operating wheel is preferably made of substantial diameter and knurled about its periphery so as to facilitate both rapid and careful rotation of the pulley R and movement of the carrier P. To insure against blacklash in the setting of the vernier block L, the carrier P is preferably formed intermediate its ends with a suitable tensioning means, herein shown as a helical coil spring $p$, one end of which is connected to a pin $2p$ fixed in one of the slide-block O and at its other end to one end of the carrier P. Any suitable medium may be employed for the carrier P, but I prefer to use a fine metallic chain which will be little affected by atmospheric conditions. One end of the chain may be suitably secured to the same pin $2p$ to which one end of the spring is attached, and the other end connected to the opposite end of the spring, as above mentioned. To provide clearance for the spring $p$ and for the component of the carrier P on the opposite side of the slide-block, the latter may be formed of reduced diameter intermediate its ends, as shown at $3p$, and grooved and holed through the resulting end flanges, as indicated at $4p$, $5p$ and $6p$. The openings $5p$ and $6p$ are in alignment, and transversely through the former extends the pin $2p$, and through the latter extends one end of the carrier P. It is preferable that the spring $p$ be confined within the approximate limits of the length of the slide-block to avoid its engagement around the pulley R. However, the opening $6p$ in the slide-block is preferably made of a diameter to permit the lower end of the spring to pass therethrough when conditions are such as require elongation of the spring to that degree.

From the foregoing detailed description it will be apparent that as the hand wheel S is turned, the carrier P will ride around the pulleys Q and R and carry with it in its upward or downward movements the slide-block O and the vernier block L. The carrier P being always under tension, it will be appreciated that all blacklash of the slide-block O within the column K will be eliminated and that the vernier block L will remain in any set position until intentionally displaced. It will also be appreciated that in view of the direct movement of the slide-block through the medium of the carrier, that adjustments of the vernier block longitudinally of the column can be rapidly effected, and through the medium of the large knurled hand wheel S accurate and minute movements of the vernier block can be accomplished so that weighings through the medium of varying the active length of the weighing chain M can be rapidly and accurately made.

While I have shown and described a preferred embodiment of my invention it is to be understood that I do not wish to be limited to the details of construction herein disclosed, since it will be apparent that the same may be modified within the range of engineering skill without departing from the spirit of my invention

What I claim is:

1. A scale or balance of the character described, comprising a hollow, vertical, graduated column, a block longitudinally slidable therein and having index means cooperating with the graduations on the column, a longitudinally flexible carrier within the column by which the block is supported, pulleys adjacent the opposite ends of the column over which said carrier is trained, said flexible carrier comprising as a part thereof a helical spring which is substantially entirely confined within the length of the block, said block having passages therein providing clearance for the flexible carrier as it is moved longitudinally of the column, and means for moving said flexible carrier.

2. A scale or balance of the character described, comprising a hollow, vertical, graduated column, a block longtudinally slidable therein and having index means cooperating with the graduations on the column, a longitudinally flexible carrier within the column by which the block is supported, pulleys adjacent the opposite ends of the column over which said carrier is trained, said flexible carrier comprising a helical spring which is substantially entirely confined within the length of the block, and a fine chain, one end of which is secured to the block, said block having passages therein providing clearance for the flexible carrier as it is moved longitudinally of the column, and means for moving said flexible carrier.

CHRISTOPHER A. BECKER.